G. D. BAILEY AND G. T. RAYFIELD.
COUPLING.
APPLICATION FILED DEC. 26, 1917.
1,316,011. Patented Sept. 16, 1919.
2 SHEETS—SHEET 1.
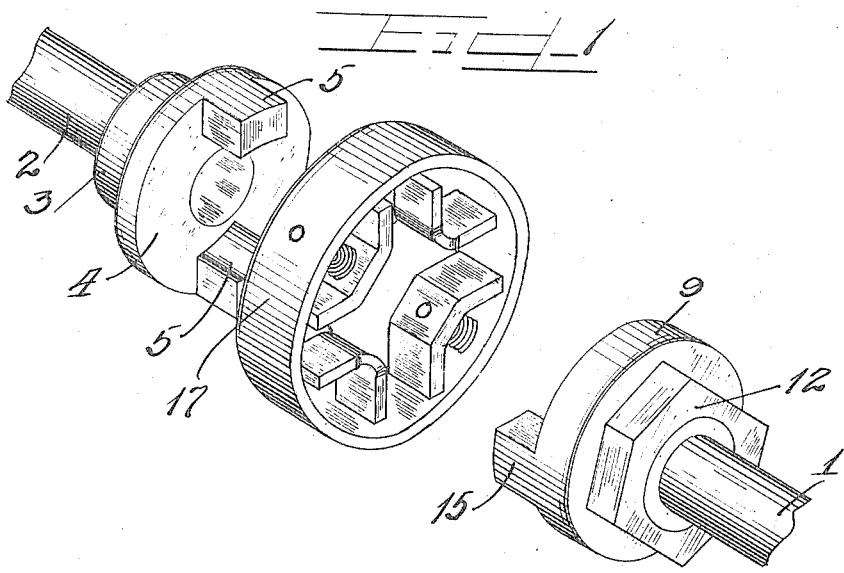
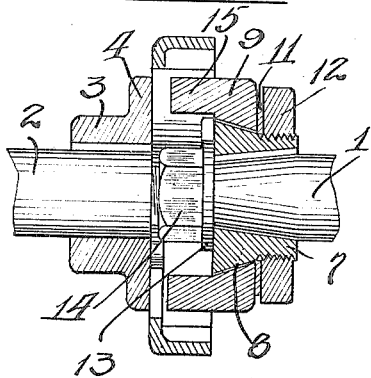
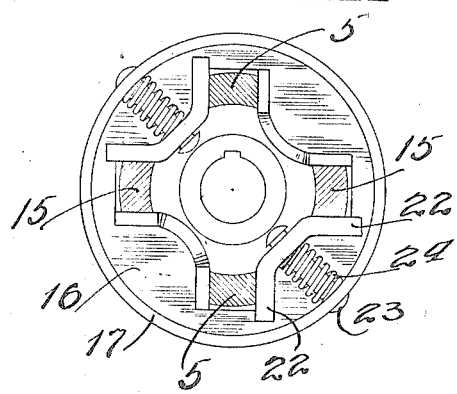
Witnesses
Rudolph T. Berg.
Inventors
GEORGE D. BAILEY.
GEORGE T. RAYFIELD.

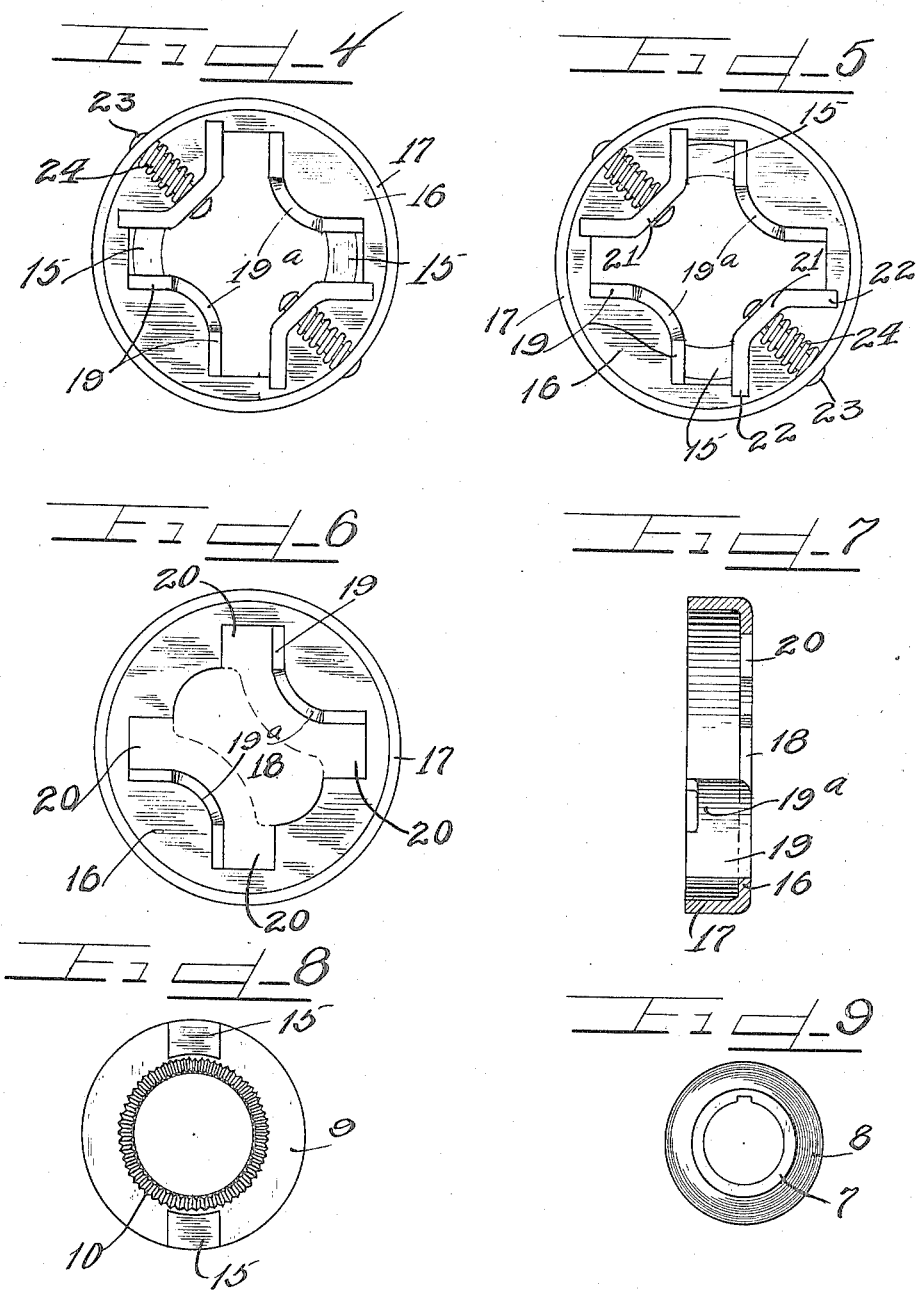

UNITED STATES PATENT OFFICE.

GEORGE D. BAILEY AND GEORGE T. RAYFIELD, OF CHICAGO, ILLINOIS.

COUPLING.

1,316,011.            Specification of Letters Patent.    Patented Sept. 16, 1919.

Application filed December 26, 1917. Serial No. 208,924.

*To all whom it may concern:*

Be it known that we, GEORGE D. BAILEY and GEORGE T. RAYFIELD, citizens of the United States, and residents of the city of Chicago, in the county of Cook and State of Illinois, have invented certain new and useful Improvements in Couplings; and we do hereby declare that the following is a full, clear, and exact description of the same, reference being had to the accompanying drawings, and to the numerals of reference marked thereon, which form a part of this specification.

It is an object of this invention to provide a shaft coupling by means of which shafts may be quickly coupled and uncoupled and to provide a mechanism for automatically taking up the wear on the coupling device.

It is also an object of this invention to greatly simplify the construction and to cheapen the cost of production.

It is further an object of this invention to provide a coupling especially adapted for use in connecting up the magneto shaft with a driven counter shaft and by means of which accurate timing of the magneto shaft is possible by adjustment of one of the coupler jaws thereby obviating the necessity of absolute accuracy in workmanship.

It is further an object of this invention to provide a coupling which is noiseless in operation and in which the coupler jaws are connected by an immediate clamping member.

The invention (in a preferred form) is illustrated in the drawings and hereinafter more fully described.

On the drawings:

Figure 1 is a perspective view of a coupler embodying our invention showing the parts separated.

Fig. 2 is a vertical longitudinal section showing the parts coupled.

Fig. 3 is a face view of the intermediate or clamping member.

Fig. 4 is a face view showing the drive coupler in position for a left hand drive.

Fig. 5 is a similar view showing the drive coupler in position for a right hand drive.

Fig. 6 is a view of the intermediate member with the radially movable jaws removed.

Fig. 7 is a central vertical section thereof.

Fig. 8 is a face view of one of the couplers showing in detail the timing arrangement.

Fig. 9 is a view of the member coacting therewith.

As shown on the drawings:

1, indicates a counter or drive shaft and 2, a magneto, pump or other driven shaft.

Rigidly secured on the shaft 2, by keying or in any other preferred manner is a coupler jaw comprising a hub member 3, having a disk 4 integral therewith which is provided with integral concentric axially directed lugs 5.

Keyed on shaft 1, and rigidly retained in place by the collar 13, and set screw 14, is a coupler jaw which comprises a sleeve or hub member 7, having its outer peripheral face beveled as at 8. A disk or collar 9, complementally beveled with the bevel face 8, is secured on the sleeve and is provided with knurls or teeth 10. A lock washer 11, is inserted on said sleeve on hub 7, and a clamp nut 12, is threaded on said sleeve to firmly force the collar 9, in place. The disk or collar 9, has a pair of axially directed lugs 15, integral therewith.

The intermediate clamping or connecting member comprises a disk 16, provided with a peripheral flange 17. Said disk has four lugs 19, struck therefrom each pair of which are connected by a reinforcing rib 19ª, and said struck up lugs and ribs form a central opening 18, and four square apertures 20.

Radially movable clamping members are provided which coact with the lugs 19, to engage the lugs 5 and 15, therebetween. These comprise a member having a flat central part 21 and angularly directed ends 22, which are adapted to lie parallel with one of the lugs 19, when in place. A pintle or bolt 23, is secured to flange 17, and the member 21 is slidable thereon but prevented from disengagement therewith, and a spring 24, is secured on the bolt tending to exert an inward pressure on the movable members.

The operation is as follows:

When connected to drive left handed the coupler jaw on shaft 1, has the lugs 15, inserted in the apertures in the intermediate member as shown in Fig. 4, and for a right handed drive the lugs are engaged in the other pair of apertures as shown in Fig. 5. In each instance the drive is against the solid lugs 19.

When the coupler jaws are assembled with the clamping or intermediate member the springs 24, force the radially movable members to firmly grip the lugs 5—15, between the same and stationary lugs 19, which firmly connects the coupler jaws to the intermediate member.

If it is desired to time the magneto shaft, the clamp nut 12, is backed up sufficient to permit clearance between the beveled faces after which the desired adjustments are made and the nut tightened which in turn forces the collar 9, upon the beveled face of the sleeve and the knurls or teeth in said collar grip or embed in the plain beveled face 8, of the sleeve preventing relative rotation between the parts when the nut is tightened.

Of course, it is understood that either the sleeve 8, or collar 9, may be provided with teeth and the other member plain. In any event, the teeth are hardened and the plain member is of softer material. In the present instance the sleeve is soft and the collar and teeth of hard material.

Inasmuch as the radially adjustable members are at all times impelled inwardly under the pressure of their springs they are automatically adjustable to compensate for any wear between the parts and the jaws are firmly gripped in place and a noiseless coupler is provided.

Many details of construction may be varied and numerous changes may be made without departing from the principles of this invention. We therefore do not desire to limit this application for patent otherwise than necessitated by the prior art.

We claim as our invention:

1. A coupler comprising oppositely disposed jaws, a clamping member having lugs struck therefrom and radially movable members coacting with said lugs to clamp the jaws therebetween.

2. A coupler comprising oppositely disposed jaws, a clamping member having lugs struck therefrom, radially movable members coacting with said lugs to clamp the jaws therebetween and springs exerting a constant pressure on said radially movable members.

3. In a device of the class described, a shaft, a sleeve thereon having a beveled face, a collar having a beveled face complemental therewith, teeth or knurls on the beveled face, means forcing the collar on the sleeve to embed the teeth on the collar into the beveled face of the sleeve and outwardly directed lugs integral with the collar.

4. In a device of the class described, coupler members, one adjustable relatively of the other, an intermediate member adapted to connect the members comprising a flanged disk, axially directed lugs struck therefrom and a radially movable member adapted to coact with each pair of lugs.

5. In a coupling, the combination of a pair of coupling sections, means connecting the sections so as to maintain a positioned driving relation therebetween, supporting means upon which one of the sections is circularly adjustable, an outwardly facing tapered shoulder on said supporting means, and a nut threaded on the supporting means, for clamping the section in position of circular adjustment against the tapered shoulder.

6. In a device of the class described the combination of a pair of rotary members arranged end to end in spaced relation, a pair of coupling sections connecting and automatically adaptable to variations in alinement of the rotary members, a sleeve adapted to be secured on one of the rotary members to rotate therewith and supporting one of the coupling sections thereon for circular adjustment, a tapered shoulder on the sleeve and a nut threaded on the sleeve for clamping said section against the tapered shoulder.

In testimony whereof we have hereunto subscribed our names in the presence of two subscribing witnesses.

GEORGE D. BAILEY.
GEORGE T. RAYFIELD.

Witnesses:
FRANK A. BREMER, Jr.,
FRED E. PAESLER.